United States Patent Office 3,674,401
Patented July 4, 1972

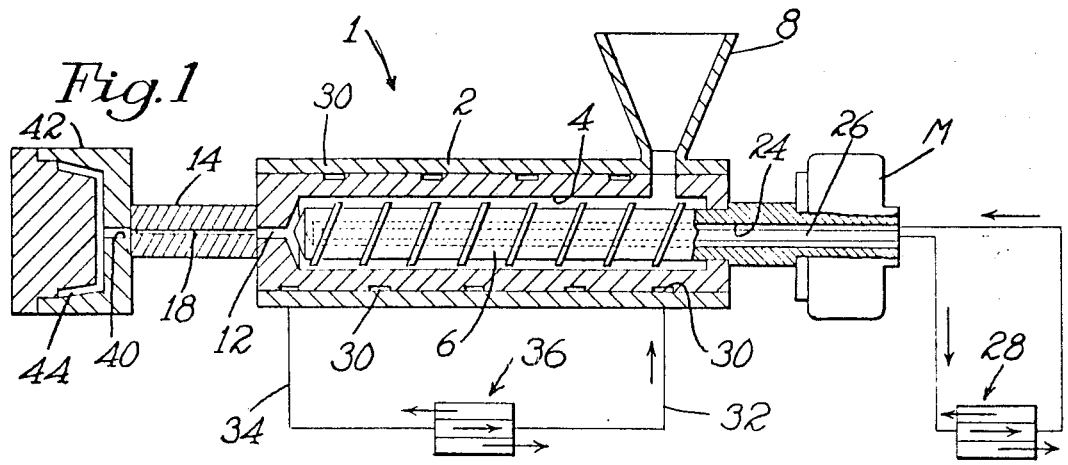
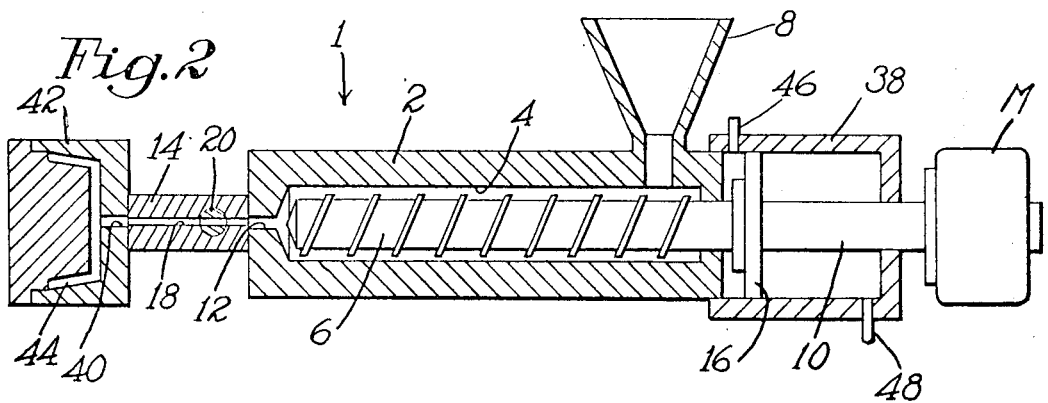
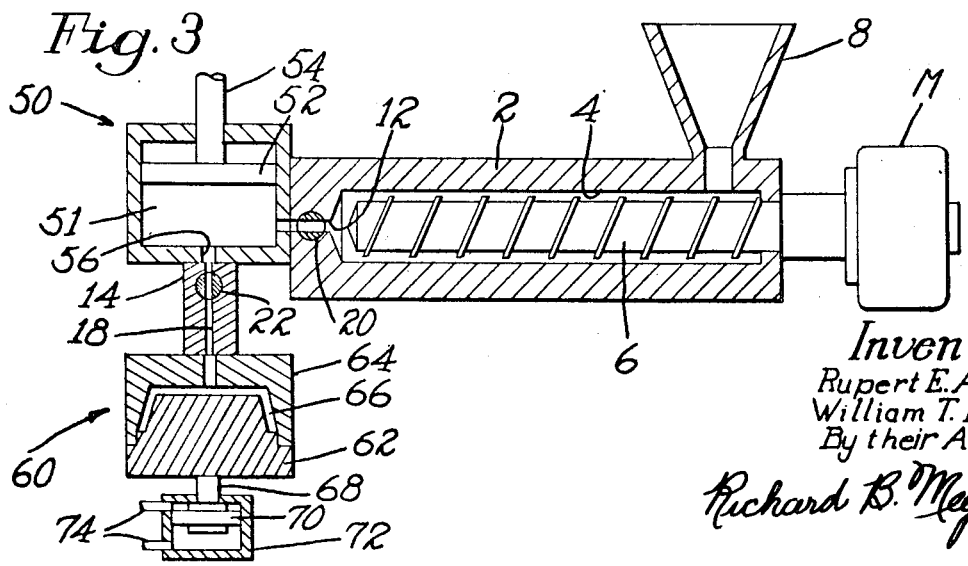

3,674,401
APPARATUS FOR INJECTION MOLDING
ARTICLES OF FOAM MATERIAL
Rupert E. Annis, Jr., Salem, and William T. Kyritsis,
Beverly Farms, Mass., assignors to USM Corporation,
Boston, Mass.
Continuation-in-part of application Ser. No. 644,886,
June 9, 1967. This application Dec. 22, 1969, Ser.
No. 886,846
Int. Cl. B29f 1/03, 1/08
U.S. Cl. 425—244
1 Claim

ABSTRACT OF THE DISCLOSURE

Apparatus for molding articles of foamed material comprising a chamber in which a mixture of organic polymeric material and blowing agent is formed at a temperature below the foaming temperature of the blowing agent, mold means having a mold cavity, and means for resisting flow of the mixture from the chamber to the mold means to impart heat to the mixture. The heat imparted is of a magnitude sufficient to raise the temperature of the mixture to the foaming temperature of the blowing agent.

BACKGROUND OF THE INVENTION

Field of the invention

This application is a continuation-in-part of our copending application Ser. No. 644,886 and includes material which was the non-elected subject matter of a requirement for restriction in said co-pending application.

This invention relates to injection molding and is directed more particularly to injection molding means for the molding of articles of foam material.

Description of the prior art

The injection molding of foam materials is generally accomplished by melting a mixture of a foamable material and a blowing agent at a temperature sufficient to cause foaming but at a pressure above the foamable pressure of the mixture so that the mixture is prevented from foaming. Ideally, pressure is maintained on the mixture until it is delivered to a mold assembly where, upon release of the pressure, the mixture expands and fills the mold cavity.

A difficulty experienced with the above method stems from the fact that the mixture expands essentially instantaneously with the release of pressure. Generally, expansion has taken place to a very substantial degree before the mixture fills the mold cavity.

Accumulation chambers have been used intermediate the melting means, which is usually a screw type plasticator, and the mold assembly. In the accumulation chamber the mixture is maintained at a pressure above the foaming pressure until the chamber is opened for ejection of the mixture, as by a piston, into a conduit leading to the mold cavity. Experience has shown that absent rather high pressure, undesirable foaming takes place in the accumulation chamber and that at any rate, as soon as the mixture is pushed out of the chamber the mixture immediately foams.

Foaming of the material prior to its being in the mold cavity usually results in rather low quality cell structure in the molded article. Further, the equipment required in an injection molding machine to maintain high pressures in an attempt to control, or at least reduce, premature foaming is expensive and often difficult to maintain.

SUMMARY OF THE INVENTION

It is an object of this invention to provide an improved apparatus for injection molding articles of foamed material.

A further object of the invention is to provide such apparatus having means for maintaining the mixture of material and blowing agent in a substantially non-foamed condition until the mixture enters the mold cavity.

Another object of the invention is to provide such apparatus having means for controling the temperature of the mixture, whereby to control foaming of the mixture.

With the above and other objects in view, as will hereafter appear, there is provided an apparatus for molding foamed material articles comprising plasticator means in which a mixture of a blowing agent and an organic polymeric material is formed, temperature control means associated with the plasticator for maintaining the mixture at a temperature below the foaming temperature of the blowing agent, a channel block connected to said plasticator and having a discharge channel provided with means for causing resistance to flow of the mixture through the channel. The discharge channel is so designed that the resistance to flow of the material therethrough imparts sufficient heat to the material to raise the temperature of the mixture to the foaming temperature of the blowing agent, whereby to initiate expansion of the mixture. Mold means are provided, along with means for establishing and terminating communication between the channel and the mold means.

The above and other features of the invention, including various novel details of construction and combinations of parts, will now be more particularly described with reference to the accompanying drawings and pointed out in the claims. It will be understood that the particular device embodying the invention is specifically adapted for chemical or decomposable compound blowing agents and is shown by way of illustration only and not as a limitation of the invention. The invention is equally useful when liquid blowing agents are to be used. The illustrated device can readily be modified to include conventional features particularly designed to accommodate the use of liquid blowing agents. The principles and features of the invention may be employed in various and numerous embodiments without departing from the scope of the invention.

BRIEF DESCRIPTION OF THE DRAWINGS

Reference is made to the accompanying drawings in which there is shown apparatus embodying the present invention from which its novel features and advantages will be apparent.

FIG. 1 is a longitudinal elevational and partially sectional view of one form of plasticator and mold assembly arrangement, in elementary form, embodying the invention, the section being taken along the center line of the plasticator housing; certain temperature control means are shown diagrammatically;

FIG. 2 is a longitudinal elevational and partially sectional view of another form of plasticator and mold assembly arrangement in elementary form embodying the invention; and FIG. 3 is a longitudinal elevational and partially sectional view of still another form of plasticator and mold assembly arrangement in elementary form embodying the invention.

DESCRIPTION OF THE PREFERRED EMBODIMENTS

Referring to FIG. 1, it may be seen that the illustrative apparatus of the present invention includes a plasticator 1 comprising a plasticator housing 2 having an elongated cavity 4 in which is disposed a plasticator screw 6. The plasticator screw 6 is rotatable by an electric motor M. A feed hopper 8 is attached to the plasticator housing 2 for admitting injection molding material, usually in pellet form, to the plasticator 6. At the end of the plasticator housing remote from the feed hopper 8 there is located a nozzle passage 12 for the transferral of plasticated material from the cavity 4 of the plasticator. A channel block 14 is attached to the plasticator housing 2 and includes a relatively long channel 18 having a relatively small diameter. The channel 18 is in alignment with the nozzle passage 12 and serves to impart heat, as by frictional resistance, to material forced therethrough, as will be further described below. The nozzle passage 12 and/or the channel block 14 may be provided with discharge valves 20, 22 (see FIGS. 2 and 3) for terminating flow through the discharge channel 18.

The illustrated embodiments shown in FIGS. 2 and 3, as well as the function and operation of the valves 20 and 22, will be described in more detail hereinafter.

Referring again to FIG. 1, it will be seen that the plasticator screw 6 is provided with an axial bore 24 having disposed therein a cooling tube 26. A cooling or heat transfer medium is transmitted by means not shown, but well known in the art, to the bore 24 where it operates to cool the plasticator screw 6. After travelling the length of the bore 24, the cooling medium enters one end of the tube 26, the left end as shown in FIG. 1, from whence it is transmitted to a cooling means, diagrammatically shown in FIG. 1 and indicated by numeral 28. As is known in the art, means (not shown) are provided for regulating the temperature of the coolant.

The plasticator housing is provided with a cooling or heat transfer channel 30 which receives a cooling or heat transfer medium by means of an inlet 32. After the coolant is circulated through the length of the spiral cooling channel 30 so as to cool the plasticator housing, the coolant is discharged through an oulet 34 which carries the coolant to a cooling means shown diagrammatically in FIG. 1 and indicated by the numeral 36. As with the cooling means 28, the cooling means 36 is provided with temperature control means which are not shown but are known in the art.

Alternatively, the temperature of material in the plasticator may be controlled by conventional thermostatic control means employed to control the amount of heat transferred to the material.

In operation, a selected injection molding material, mixed with an appropriate blowing agent, is placed in the feed hopper 8 from which the mixture moves, as by gravity, to the receiving end of the plasticator housing (the right hand end as shown in FIG. 1). The plasticator 6 rotates within the plasticator housing cavity 4 and plasticates the mixture from the feed hopper 8.

Any of the heat softenable organic polymeric resinous materials commonly processed by injection molding to form foamed articles may be treated according to the present process. Among such resins are the polyethylenes, polypropylenes, ethylene-propylene copolymers, polystyrene, polyamides, acetals, polycarbonates, polymers and copolymers of vinyl chloride, cellulose derivative plastics such as ethyl cellulose, acrylonitrile-butadiene-styrene terpolymers, polyurethanes and epoxy resins.

The blowing agent may be selected from compounds such as azo, N-nitroso, carbonate and sulfonyl hydrazide compounds. Normally gaseous agents, such as methylchloride, butylene, fluorocarbon and propylene, may also be used as the blowing agent as well as gases such as air or carbon dioxide. If a gaseous blowing agent is used it is generally introduced into the plasticator cavity 4 by means (not shown) other than the feed hopper. Liquid blowing agents such as liquid fluorocarbons, pentane and water may also be employed as foaming agents.

Although various types of blowing agents which can be utilized to produce a foamed material can be mixed with the material at various stages in the process, if liquid or gaseous agents are selected it is preferable that they be introduced directly to the molten material in the plasticator to obtain a uniform dispersion of the agent within the molten material. A decomposable compound blowing agent is preferably mixed with the molding material prior to the admission of the material into the plasticator cavity.

Plastication of the injection molding material causes the temperature of the material to rise sharply and the injection molding material to become molten. To prevent reaching the foaming temperature of the blowing agent in the plasticator housing, coolants are forced through the cooling channel 30 in the plasticator housing 2 and through the bore 24 in the plasticator screw 6. As noted above, thermostatic means may alternately be utilized to control the temperature which the mixture of the molding material and blowing agent attains in the plastication step. Upon reaching the discharge end of the plasticator (the left hand end as viewed in FIG. 1) the molten mixture enters the nozzle passage 12 and thereafter the discharge channel 18.

In the embodiment illustrated in FIG. 1, the discharge channel 18 is relatively elongated in length and of reduced diameter. The length of the channel 18 and its diameter cooperatively resist the flow of molten material therethrough by frictional resistance. The molten mixture, however, is forced through the channel 18 by the continued rotation of the plasticator 6 which acts as a screw pump.

The combination of length and diameter or cross-section of the channel required to provide sufficient frictional resistance to elevate the temperature of the mixture from a temperature below the blowing temperature to the desired blowing temperature may be determined by the use of the following formula:

$$\Delta T = \frac{(3\bar{n}+1)^2}{\bar{n}(\bar{n}+l)} \cdot \frac{L\bar{\mu}q}{\pi R^2 \rho c}$$

where:

$\Delta T$ is the temperature rise
$\bar{n}$ is the average flow index
$L$ is the length of the channel
$R$ is the radius of the channel
$\bar{\mu}$ is the average viscosity of the material
$q$ is the volumetric flow rate
$\rho$ is the density of the melted material
$c$ is the specific heat of the material This formula is derived as follows:
The pressure drop occurring across a nozzle may be related to the flow rate by the following:

$$\Delta P = \frac{8L}{\pi R^4} \bar{\mu} q$$

Where $\Delta P$ is the pressure drop. See E. C. Bernhardt, Processing of Thermoplastic Material, pages 197, 249, Runhold, New York 1959 in re the above formula.

The viscosity is obtained from rheological laboratory test data and put in the form:

$$\ln \bar{\mu} = a_0 + a_1 \ln \bar{\gamma} + a_2 (\ln \gamma)^2 + a_3 T + a_4 T + a_5 T \ln \bar{\gamma}$$

where:

ln is the natural logarithm
$\gamma$ is an average shear rate or velocity gradient
$T$ is an average temperature The shear energy density is obtained from:

$$S.E = \bar{\mu}(\partial v/\partial r)^2$$

where $\partial v/\partial r$ is the local velocity gradient.

The shear work is obtained by integrating the shear energy density over the volume enclosed by the nozzle walls:

$$S.W. = \int \int_R (\bar{\mu}(\partial v/\partial r)^2 2\pi r \partial r \partial L$$

The local velocity gradient is obtained by assuming that the following velocity profile exists in the nozzle:

$$v = \left(\frac{3\bar{n}+1}{\bar{n}+1}\right)\frac{q}{\pi R^2}\left[1-(r/R)^{\frac{\bar{n}+1}{\bar{n}}}\right]$$

Where $\bar{n}$ is obtained from the average velocity, average shear rate relationship as:

$$\bar{n} = 1 + a_1 + a_2 \ln\bar{\gamma} + a_5 T$$

See J. M. McKelvey, Polymer Processing, page 67, Wiley, New York, 1962 in this regard.

The local velocity gradient then becomes:

$$\partial v/\partial r = \left(\frac{3\bar{n}+1}{\bar{n}}\right)\left(\frac{q}{\pi R^3}\right)(r/R)^{1/\bar{n}}$$

Upon integration, shear work is:

$$S.W = \frac{q \Delta P}{8} \frac{(3\bar{n}+1)^2}{\bar{n}(\bar{n}+1)}$$

Equating this to the increase in thermal energy, $$\rho c q \Delta T = \frac{q \Delta P}{8} \frac{(3\bar{n}+1)^2}{\bar{n}(\bar{n}+1)}$$

Therefore $$\Delta T = \frac{(3\bar{n}+1)^2 \Delta P}{\bar{n}(\bar{n}+1) 8 \rho c}$$

or $$\Delta T = \frac{(3\bar{n}+1)^2}{\bar{n}(\bar{n}+1)} \cdot \frac{L \bar{\mu} q}{\pi R^2 \rho c}$$

Utilizing the above it may be determined that, for the materials delineated above, the preferred length of the channel is approximately ¼" to 3" and the preferred diameter is approximately .090" to 1", the variations being dependent upon the shot size requirements of current injection molding machinery.

Means, such as for example, those described in Pat. No. 3,006,032, issued Oct. 31, 1961 upon application of W. L. Baker et al., are employed to connect the discharge passage 18 to a sprue channel 40 located in a mold assembly 42 and in communication with a mold cavity 44. The molten mixture from the channel 18 proceeds through the sprue channel 40 into the mold cavity 44. When the mold cavity is filled, a cut-off device, such as that described in Pat. No. 3,299,476, issued Jan. 24, 1967 upon application of D. B. McIlvin, operates to terminate further pumping by the plasticator.

During the injection molding operation, the heat imparted by frictional resistance in the discharge passage 18 to the molten mixture must be of a magnitude sufficient to raise the temperature of the mixture to the foaming temperature of the blowing agent used in the mixture.

While the discharge channel block 14 may be an integral part of the plasticator housing 2, it is preferable that it be a separate unit so that only the discharge block 14 need be changed when there is a change in the mixture used such as to necessitate a smaller or larger diameter channel.

Referring to FIG. 2, it will be seen that another embodiment of the present invention comprises an apparatus similar to that shown in FIG. 1, but in which the plasticator screw 6 reciprocates in the plasticator chamber 4. To facilitate the reciprocating movement of the plasticator screw 6 the plasticator is provided with an extension 10 having a piston 16 mounted thereon. The piston 16 is disposed in a cylinder 38 having fluid conduits 46 and 48. By means known in the art the plasticator screw 6 is caused by the motor M to rotate in the chamber 4 and at the proper moment in a cycle of operation to be moved in accordance with fluid pressures in the cylinder 38 from right to left as viewed in FIG. 2, so as to force a quantity of molten material from the chamber 4 and through the nozzle passage 12.

Similarly to the apparatus shown in FIG. 1, the apparatus of FIG. 2 is provided with a channel block 14 having a discharge channel 18 which connects with the inlet 40 of a mold assembly 42. In this embodiment the channel block 14 with its discharge channel 18 serves the same purpose as the channel block 14 of the embodiment of FIG. 1. The length and diameter of the discharge channel 18 is selected so as to impart sufficient heat to the molten material forced therethrough by the rotation and reciprocation of the plasticator screw 6 to raise the material to a temperature equal to the foaming temperature of the blowing agent. Although not shown in FIG. 2, the reciprocating screw embodiment preferably includes cooling means for the plasticator screw 6 and plasticator housing 2 substantially the same as that shown in FIG. 1.

Referring to FIG. 3, it will be seen that a still further embodiment of the inventions includes a single action pump 50 having a chamber 51 which receives molten material from a plasticator 1 having a plasticator screw 6 which is rotated by a motor M. Again, as in the embodiment shown in FIGS. 1 and 2, the injection molding material worked by the plasticator screw 6 is maintained at a temperature below foaming temperature of the blowing agent used, preferably by cooling means as shown in FIG. 1. Thus, the molten injection molding material enters the pump 50 at a temperature below the foaming temperature. As the material enters the pump 50 it causes a piston 52 and piston rod 54 to move upwardly, as viewed in FIG. 3. By means known in the art, such as that shown in U.S. Pat. No. 3,006,032, issued Oct. 31, 1961 on application of W. L. Baker et al., when the piston 52 has risen to a point selected in accordance with the volume of molten material desired in the pump, the plasticator screw 6 is stopped and/or the valve 20 is closed and piston 52 caused to move downwardly.

In accordance with the present invention a channel block 14 having a discharge channel 18 is attached to the pump 50 with the channel 18 in alignment with a pump discharge nozzle 56. The valve 22 disposed in the channel block 14 is preferable in this embodiment and is moved to the open position automatically by means not shown, but known in the art, as the piston 52 starts its travel downwardly.

Downward movement of the piston 52 forces the molten material therein out the nozzle 56 and into the channel 18. As in the embodiments shown in FIGS. 1 and 2, the channel 18 is sufficiently elongated and of reduced diameter so that the length and diameter, by frictional resistance to flow, impart enough heat to the mixture forced therethrough to raise the temperature of the mixture to the foaming temperature of the blowing agent whereby to initiate the foaming action.

It has been found to be advantageous to provide a mold assembly having means for enlarging the mold cavity after the cavity is filled with molding material. Such a mold assembly 60 is illustrated in FIG. 3 but is applicable to all three embodiments shown.

Referring to FIG. 3, it will be seen that the illustrative mold assembly 60 includes a mold member 62 which may be moved relative to the remainder of the mold assembly 64 without opening the mold cavity 66 formed by the mold members 62, 64. Means 61 for moving the mold member 62 may comprise a piston rod 68 interconnecting the member 62 and a piston 70 located in a cylinder 72. Conduits 74 permit the entrance and escape of fluid for controlling the movements of the piston 70 in the cylinder 72 and thereby the movement of the mold member 62 in the mold assembly 60.

In operation, the mold member moving means is controlled automatically by means (not shown) responsive to filling of the mold or responsive to the completion of the downward movement of the piston 52 in the pump 50, so that after the mold is filled, the member 62 moves in a direction outwardly from the mold member 64 whereby to enlarge the mold cavity and permit expansion of the mixture therein, the mixture having previously been placed in condition for expansion by its having reached the foaming temperature of the blowing agent in the channel 18 of the block 14.

As an alternative to the relatively long and relatively small diameter channel 18 in the discharge channel block 14, there may be utilized a channel of shorter length and larger diameter, but having means located therein for imparting frictional heat to the molten material passing therethrough. An arrangement of flow retarding vanes have been found to accomplish substantially the same result. However, from a manufacturing standpoint the long, small diameter channel is preferable.

As used herein, the term "foaming temperature" means that predetermined range of temperature for a particular combination of organic polymeric material and blowing agent at which the foaming process will produce a foam structure having a desired or preferred character. If expansion takes place above the predetermined foaming temperature, the cells in the first portion of the material entering the mold will be too large (and may even burst) and the molded article will have uneven cell size and distribution. If expansion takes place below the predetermined foaming temperature, unsatisfactory mold filling, inadequate or incomplete blowing and uneven cell size and distribution will result.

It is to be understood that the present invention is by no means limited to the particular construction shown in the drawings, but also comprises any modifications within the scope of the appended claim.

Having thus described our invention, what we claim as new and desire to secure by Letters Patent of the United States is:

1. Apparatus for molding articles of foamed material comprising a plasticator having a chamber for containing a mixture of thermoplastic organic polymeric material and a blowing agent, means for maintaining the mixture within the chamber in molten condition and at a temperature below the foaming temperature of the blowing agent, and a nozzle channel associated with said plasticator having a first diameter for transferral of plasticated material from said chamber, mold means at a temperature below the melting temperature of the material and having a mold cavity, said mold means which includes no heating means and having a sprue channel formed therein having a second diameter, means for forcing a mass of said mixture from said chamber into said cavity, and a channel block extending between said plasticator and said mold, said channel block having a channel portion having a diameter less than said first and second diameters in communication with said sprue channel and nozzle channel and through which said mixture is forced, and valve means located in said channel for controlling flow of said material and maintaining pressure within said plasticator chamber, the cross section and length of said channel portion being correlated with the capacity of said means for forcing said mixture from said chamber into said cavity and with the physical properties of said mixture in accordance with the formula:

$$\Delta T = \frac{(3\bar{n}+1)^2}{\bar{n}(n+1)} \cdot \frac{L\bar{\mu}q}{\pi R^4 \rho c}$$

wherein:

T is the temperature rise
$\bar{n}$ is the average flow index
L is the length of the channel portion in the range of ¼" to 3"
R is the radius of the channel portion in the range of .045" to .5"
$\bar{\mu}$ is the average viscosity of the material
q is the volumetric flow rate
$\rho$ is the density of the melted material
c is the specific heat of the material whereby to raise the temperature of said mixture from said temperature below the foaming temperature in said chamber to said foaming temperature as the mixture passes through said channels by heat generated solely by the frictional engagement of said mixture with the surface of said channels whereby said mixture reaches said foaming temperature as it enters the mold cavity.

References Cited

UNITED STATES PATENTS

| | | | |
|---|---|---|---|
| 3,192,299 | 6/1965 | Hendry | 264—68 |
| 2,460,831 | 2/1949 | Kovacs | 264—68 UX |
| 2,928,125 | 3/1960 | Smucker et al. | 18—30 NB X |
| 3,052,925 | 9/1962 | Bronnenkant et al. | 18—30 NB UX |

FOREIGN PATENTS

| | | | |
|---|---|---|---|
| 1,023,888 | 3/1966 | Great Britain | 264—328 |

J. SPENCER OVERHOLSER, Primary Examiner

M. O. SUTTON, Assistant Examiner

U.S. Cl. X.R.

264—68; 425—4, 817, 208